US012601398B2

(12) United States Patent
Byrne

(10) Patent No.: US 12,601,398 B2
(45) Date of Patent: Apr. 14, 2026

(54) VENT BOX BAFFLE INSERT

(71) Applicant: Dana Automotive Systems Group, LLC, Maumee, OH (US)

(72) Inventor: Steven Thomas Byrne, Holland, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 259 days.

(21) Appl. No.: 18/460,970

(22) Filed: Sep. 5, 2023

(65) Prior Publication Data

US 2025/0075789 A1 Mar. 6, 2025

(51) Int. Cl.
*F16H 57/027* (2012.01)
*B60B 35/16* (2006.01)

(52) U.S. Cl.
CPC ........... *F16H 57/027* (2013.01); *B60B 35/16* (2013.01)

(58) Field of Classification Search
CPC ........................... F16H 57/027; F16H 57/0423
See application file for complete search history.

(56) References Cited

U.S. PATENT DOCUMENTS

| | | | |
|---|---|---|---|
| 5,813,493 A | 9/1998 | Sloan et al. | |
| 10,077,691 B2 * | 9/2018 | Palazzolo | ........... F16H 57/0452 |
| 10,948,068 B2 * | 3/2021 | Tesner | .................. F16H 57/027 |
| 11,739,877 B2 * | 8/2023 | Christoff, III | .... F16L 55/02736 |
| | | | 138/42 |
| 12,252,327 B2 * | 3/2025 | Hoskins | .................... B32B 5/18 |
| 2007/0295158 A1 | 12/2007 | Adleman et al. | |
| 2024/0082772 A1 * | 3/2024 | Dahlstrom | ............. B01D 46/62 |

FOREIGN PATENT DOCUMENTS

| | | | | |
|---|---|---|---|---|
| DE | 102010054187 A1 | | 6/2012 | |
| DE | 102017114889 A1 * | | 1/2019 | ........ F16H 57/0461 |
| DE | 102020114690 A1 | | 12/2021 | |
| JP | 2000065191 A * | | 3/2000 | ........... F16H 57/027 |
| KR | 19980054380 U * | | 10/1998 | ............. B60B 35/16 |
| KR | 100828772 B1 | | 5/2008 | |
| KR | 20200142802 A * | | 12/2020 | ........ F16H 57/0471 |

* cited by examiner

*Primary Examiner* — Patrick Cicchino

(74) *Attorney, Agent, or Firm* — McCoy Russell LLP

(57) ABSTRACT

Systems are provided for an axle assembly for a vehicle comprising a baffle that includes a first section parallel to a first plane, a second section parallel to a second plane and angle to the first section, and a third section parallel to a third plane and angled to the first section and the second section, where the baffle is a spring.

17 Claims, 8 Drawing Sheets

VENT BOX BAFFLE INSERT

TECHNICAL FIELD

The present description relates generally to a baffle. More specifically, the present disclosure relates to a baffle for a drive axle assembly housing.

BACKGROUND AND SUMMARY

Vehicle drive axle assemblies may include a differential system which allows a wheel on one end of a drive axle to rotate at a different rotational rate than a wheel on the other end of the drive axle. The differentiation between the two wheels on opposing ends of a drive axle assembly is generally utilized to prevent wheel "skip" or hopping when, for example, the two wheels travel different distances through a turn, or two tires having different diameters are used.

The differential system is generally enclosed in a drive axle assembly housing and is bathed in a lubricant to reduce friction and increase longevity of the various rotating internal differential components. As the differential operates (e.g., as gears of the differential rotate), lubricant may splash or be thrown, and in some cases may exit (e.g., may leak from) the drive axle assembly housing through a vent and/or breather. A shortage of lubricant in the drive axle assembly housing may lead to reduced longevity of differential components and/or reductions in performance. In addition, a portion of the lubricant that escapes out of the drive axle assembly housing is often retained on the housing and can result in discoloration. Further, a portion of the lubricant that escapes out of the drive axle assembly housing may drip or fall underneath the vehicle onto the drive way and/or garage floor, creating customer dissatisfaction and/or the perception that a leak is present. Additionally or alternatively, lubricant may contribute to greenhouse gas emissions and efforts to mitigate global warming may be desired.

Attempts to address lubricant escaping from a drive axle assembly housing include mounting a baffle proximate to the vent and/or a breather within the drive axle assembly housing. The housing may be shaped and/or molded to include threaded bores and/or shapes for mounting the baffle via a fastener, weld, or other additional element.

However, the inventors herein have recognized potential issues with such systems. Baffles with a single surface or multiple surfaces oriented in a single plane may not adequately prevent lubrication splashes and/or lubrication bubbles from escaping a drive axle assembly housing. Additionally, by requiring attachment devices and/or bores configured for mounting the baffle, the manufacturing complexity, the manufacturing cost, and the installation difficulty of the baffle increase. Often times it may be difficult to maneuver a tool for an attachment device into the drive axle assembly due to space constraints. Further, the attachment device is held to a tight tolerance to prevent the baffle from changing position and possibly interfering with rotating differential components.

In one example, the issues described above may be addressed by an axle assembly for a vehicle comprising a baffle that includes a first section parallel to a first plane, a second section parallel to a second plane and angled toward the first section, and a third section parallel to a third plane and angled to the first section and the second section, wherein the baffle is a spring. In this way, the baffle includes multiple surfaces, each oriented in a different plane to mitigate the escape of lubricant from the drive axle assembly housing. Further, the baffle may be installed in a drive axle assembly housing without the use of attachment devices and/or mounting bores. As an example, the baffle may exert a force on the drive axle assembly housing that retains the baffle within a cavity of the drive axle assembly housing. The force may be tailored to specific vehicle driving conditions such that it may retain the baffle through vibrations, harshness, and other conditions. By doing this, the baffle may be installed without a tool or specific mounting points.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
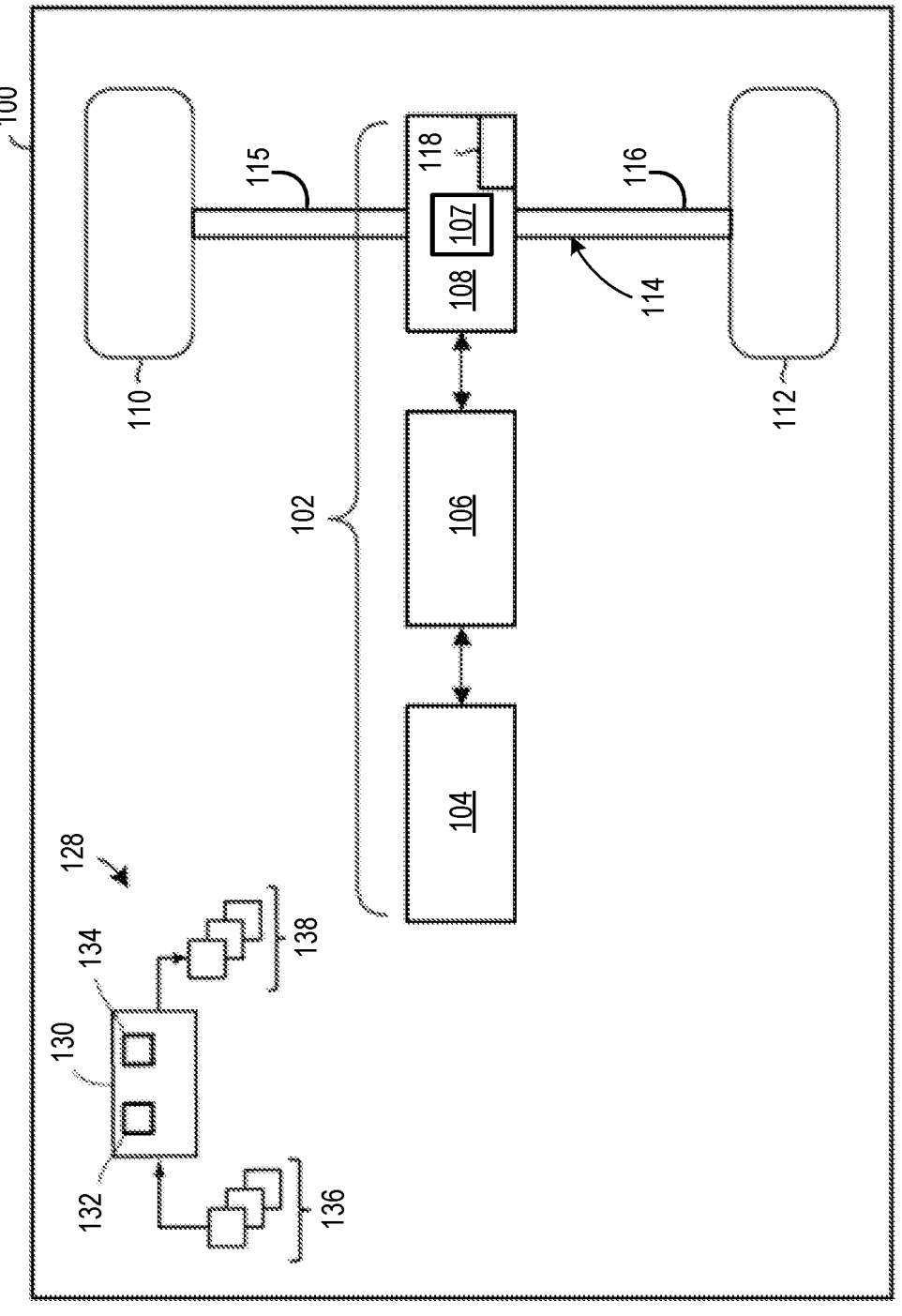
FIG. 1 shows an exemplary vehicle including a drive axle assembly housing.
Figure 2:
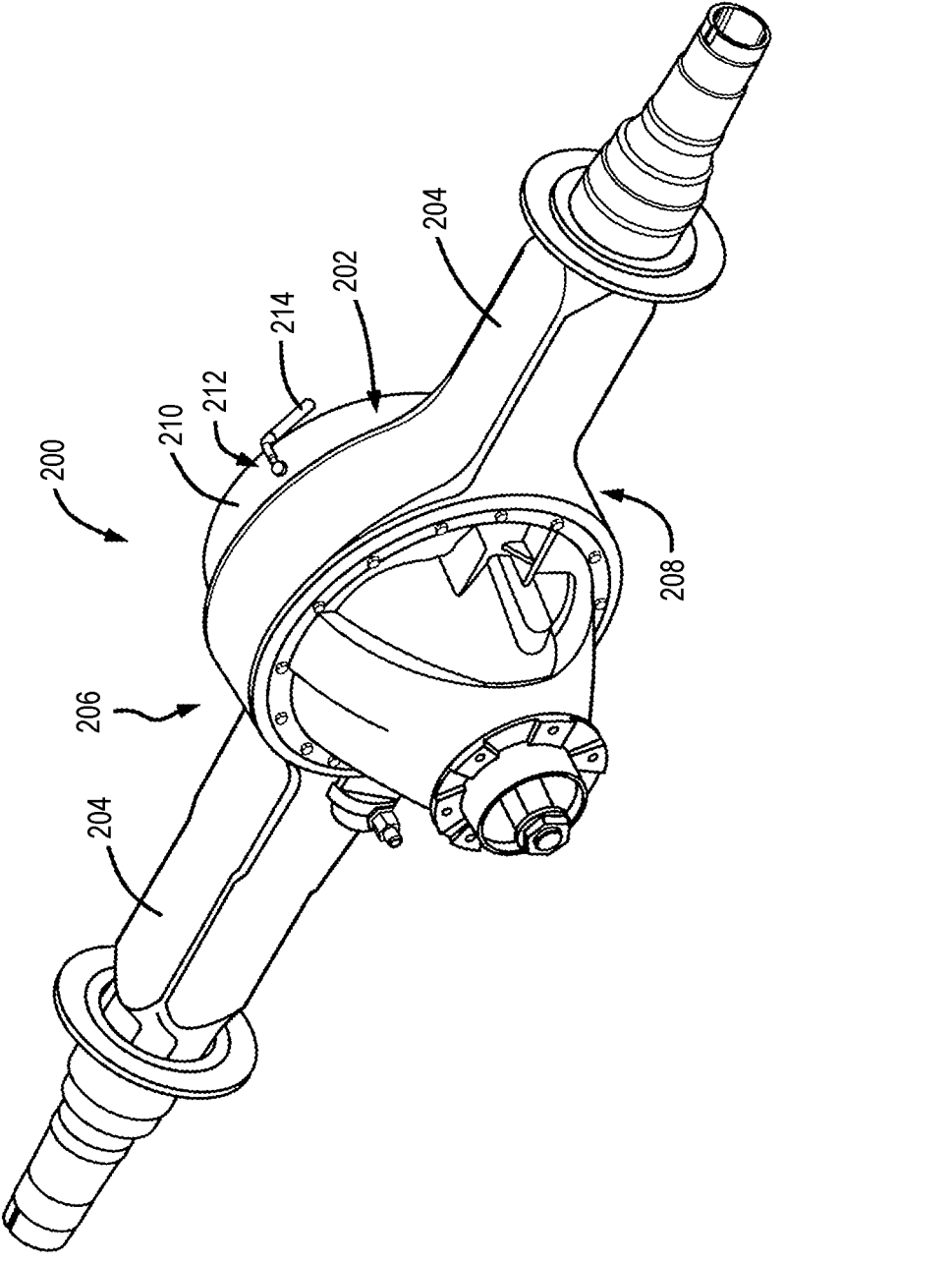
FIG. 2 shows an exemplary drive axle assembly housing.
Figure 3:
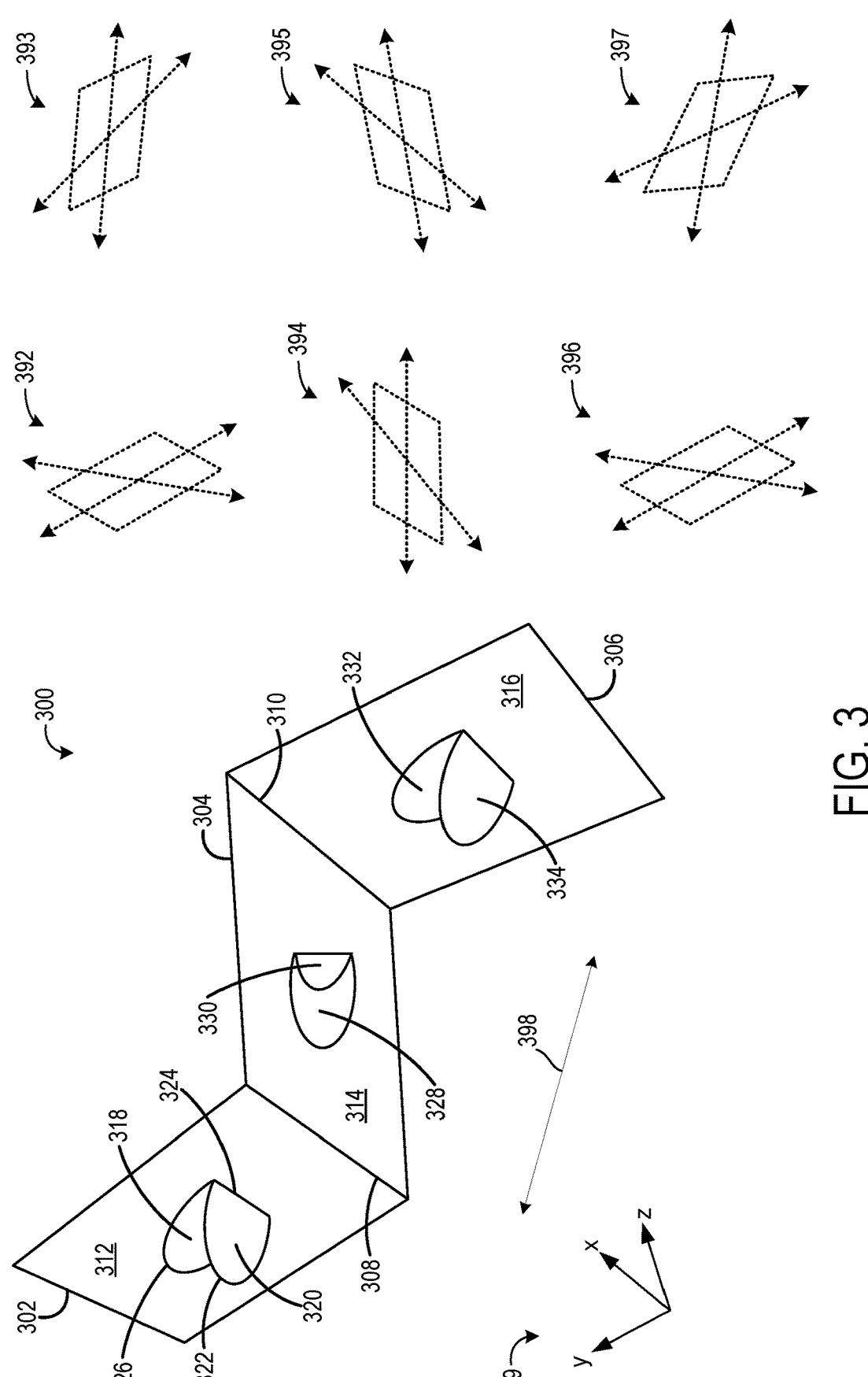
FIG. 3 shows a first schematic view of a baffle, in accordance with one or more embodiments of the present disclosure.
Figure 4:
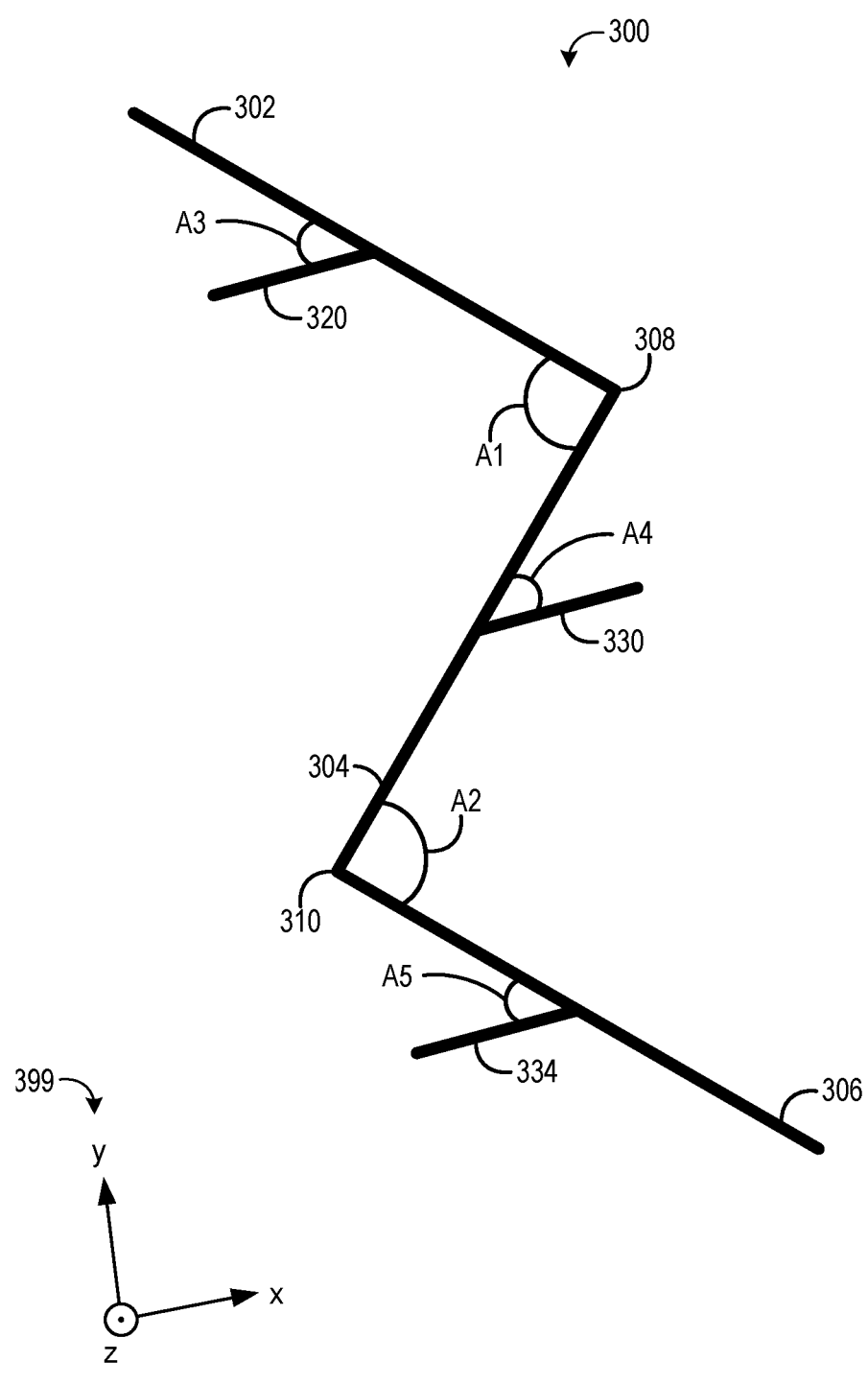
FIG. 4 shows a second schematic view of the baffle of FIG. 3.
Figure 5:
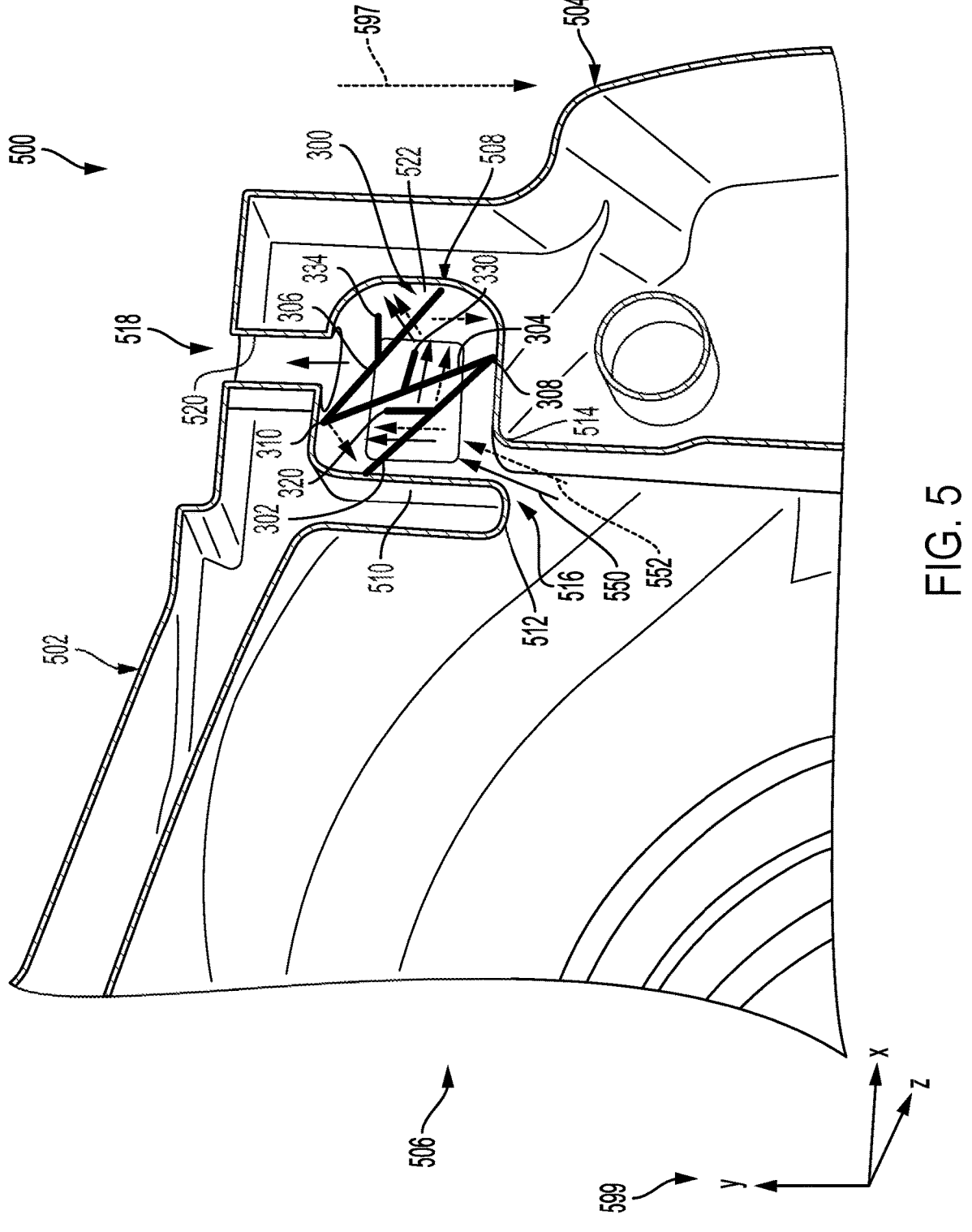
FIG. 5 shows a first view of an exemplary drive axle assembly housing including the baffle of FIG. 3.
Figure 6:
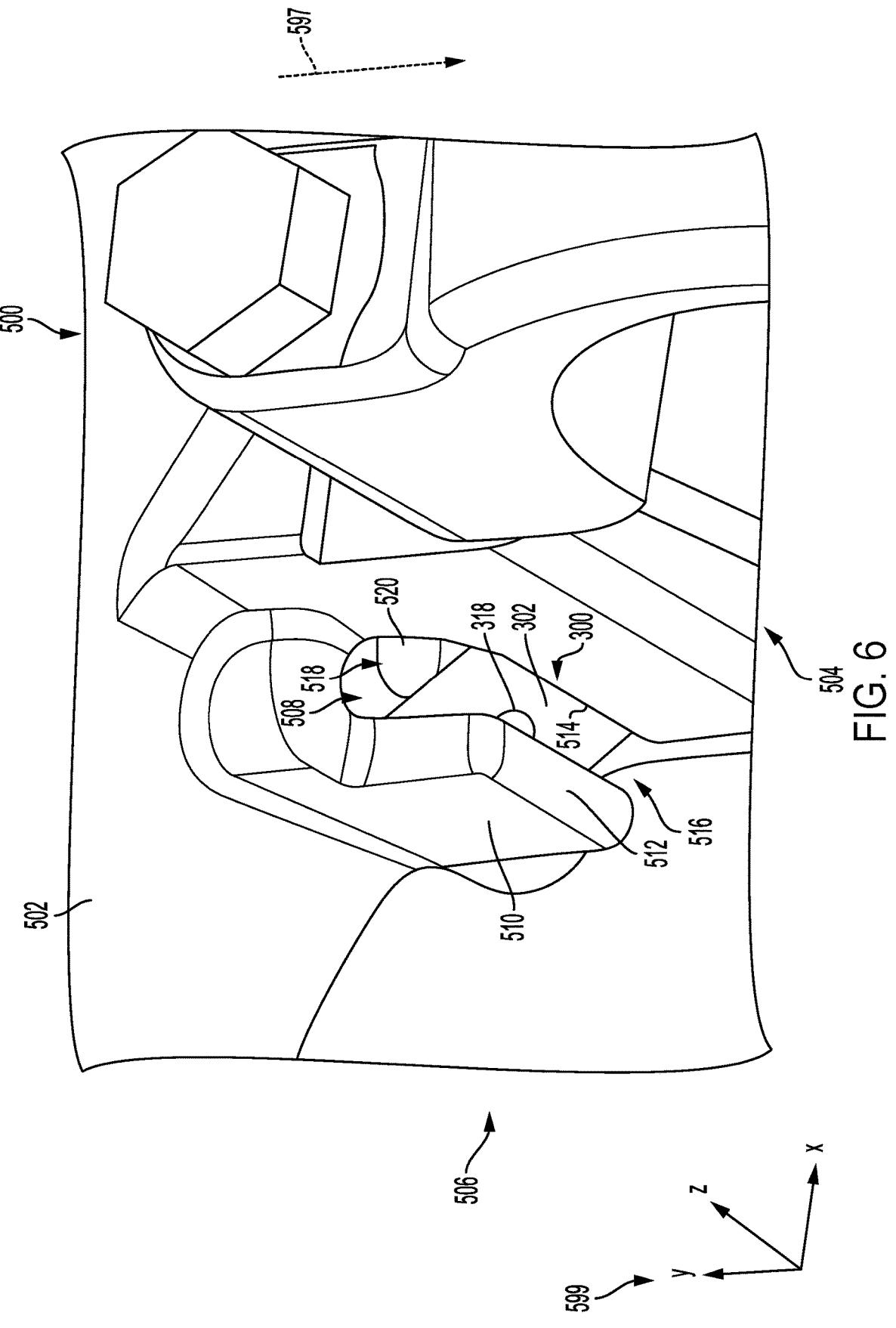
FIG. 6 shows a second view of the drive axle assembly housing of FIG. 5.
Figure 7:
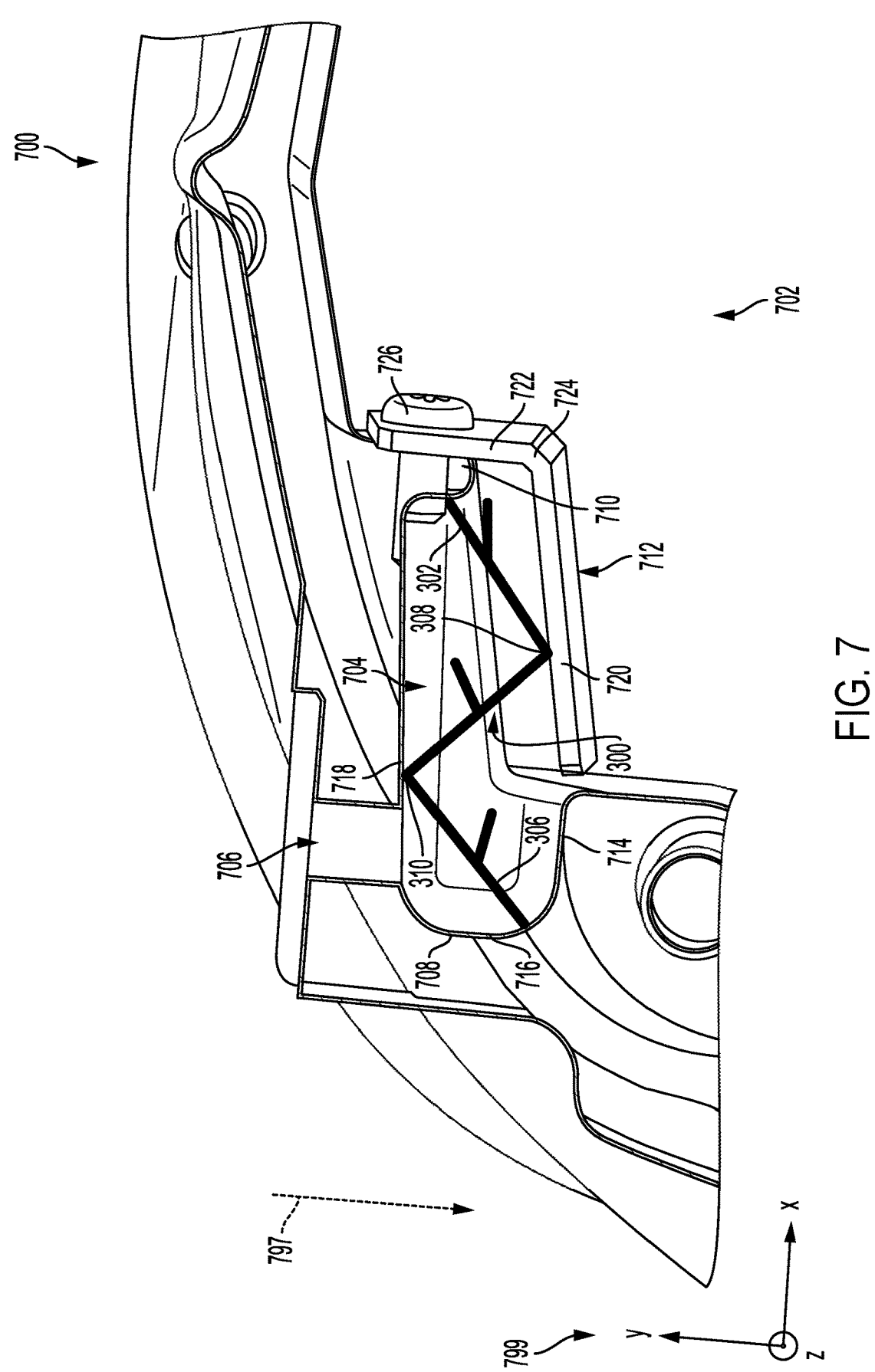
FIG. 7 shows a second exemplary drive axle assembly housing including the baffle of FIG. 3 in a first orientation.
Figure 8:
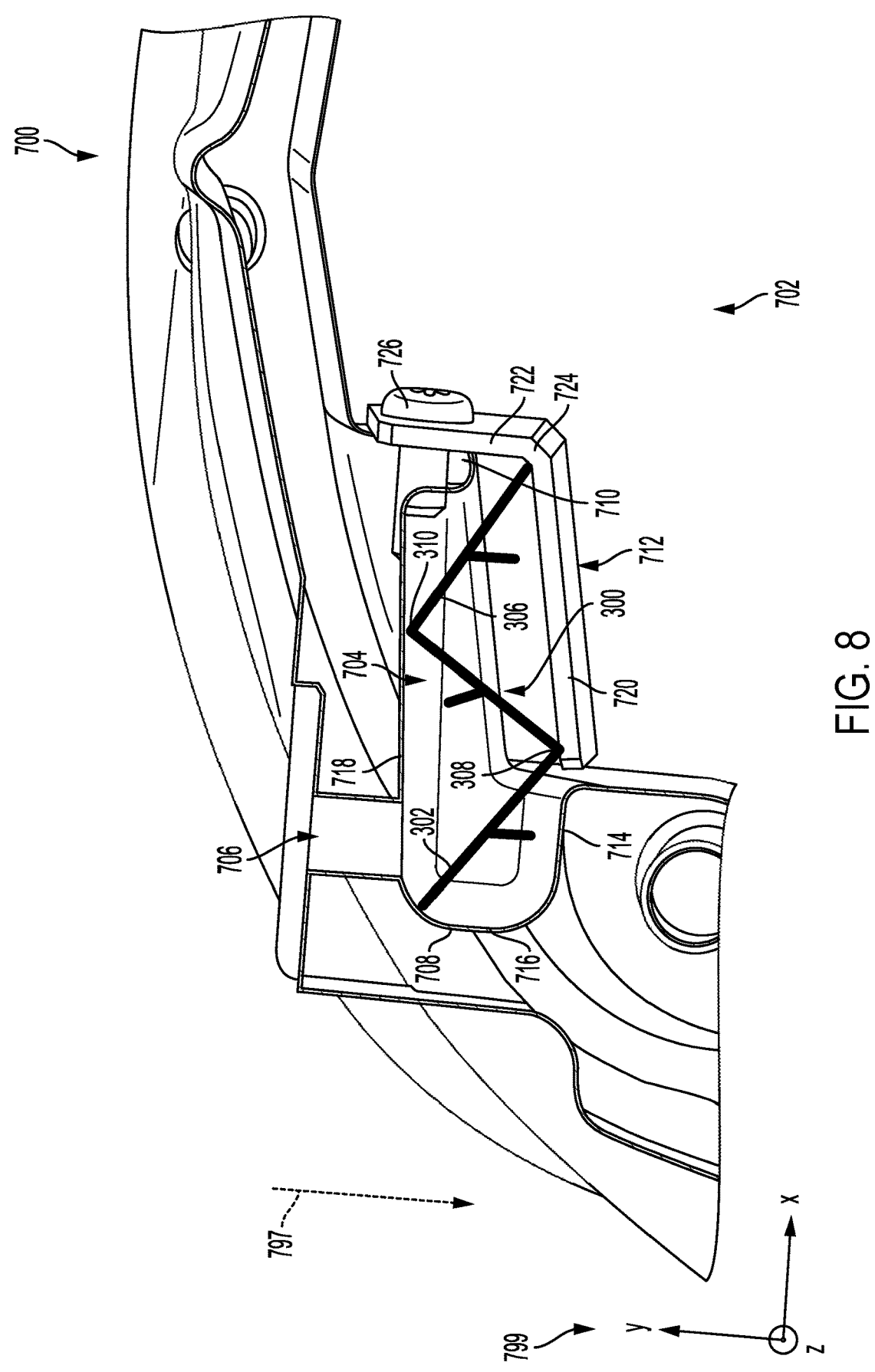
FIG. 8 shows the drive axle assembly housing of FIG. 7 including the baffle of FIG. 3 in a second orientation.

The following description relates to an axle housing including a baffle for reducing oil expulsion from a vent in the axle housing. FIG. 1 depicts a vehicle with a powertrain that includes a drive axle assembly housing. FIG. 2 shows an exemplary drive axle assembly housing including a vent box. FIGS. 3 and 4 illustrate a baffle that may be inserted into the drive axle assembly housing of FIG. 2 to inhibit and/or prevent lubricant from passing through the vent box of the drive axle assembly housing. FIGS. 5 and 6 show a first example drive axle assembly housing architecture including the baffle positioned within a vent box. FIGS. 7 and 8 show a second example axle housing architecture with the baffle positioned in a first orientation and a second orientation, respectively. FIGS. 2, 5-8 are shown to scale, other than the schematically illustrated baffle, though other relative dimensions may be used.

FIG. 1 schematically illustrates a vehicle 100 with a powertrain 102 according to the present disclosure. The vehicle 100 may take a variety of forms in different embodiments such as a light, medium, or heavy duty vehicle. To generate power, the powertrain 102 may comprise a motive power source 104. The motive power source 104 may include an internal combustion engine, electric motor, combinations thereof, or other suitable devices designed to generate rotational energy. The internal combustion engine may include conventional components such as cylinder(s), piston(s), valves, a fuel delivery system, an intake system, an exhaust system, etc. Further, the electric motor may include conventional components such as a rotor, a stator, a housing, and the like, for generating mechanical power as well as electrical power during a regeneration mode, in some cases. As such, the powertrain 102 may be utilized in a hybrid or electric vehicle (e.g., battery electric vehicle). Therefore, the powertrain 102 may have a parallel, a series, or a series-parallel hybrid configuration, in certain instances. In other examples, however, the vehicle 100 may solely use an internal combustion engine for power generation. Additionally or alternatively, the vehicle 100 may include only an electric motor.

The motive power source 104 may provide mechanical power to a differential 107 via a transmission 106. The power path may continue through the differential 107 to an axle 114, which includes a first axle shaft 115 and a second axle shaft 116. Mechanical power may be distributed to a first drive wheel 110 and a second drive wheel 112 by way of the first axle shaft 115 and the second axle shaft 116, respectively. As such, the differential 107 may distribute rotational driving force, received from the transmission 106, to the first drive wheel 110 and the second drive wheel 112 of the first axle shaft 115 and the second axle shaft 116, respectively, during certain operating conditions.

The transmission 106 may have a gear reduction that provides a speed-torque conversion functionality. To elaborate, the transmission 106 may be a gearbox capable of shifting, a continuously variable transmission, an infinitely variable transmission, and the like. The transmission 106 may make use of mechanical components such as shafts, gears, bearings and the like to accomplish the aforementioned gear reduction functionality.

The differential 107 may be configured to permit speed deviation between the axle shafts during certain conditions, such as cornering. However, to increase vehicle traction, the differential 107 may be a limited slip differential designed to constrain speed deviation between the first axle shaft 115 and the second axle shaft 116 during certain conditions. To accomplish this speed constraint functionality, the differential 107 may include a case, sets of pinion gears, and side gears. The differential 107 may be positioned within a drive axle assembly housing 108. As such, a portion of the axle 114 (e.g., of the first axle shaft 115 and the second axle shaft 116) may be positioned within the drive axle assembly housing 108. The drive axle assembly housing 108 is further described with reference to FIG. 2.

FIG. 1 further shows a lubrication system 118 designed to supply lubricant (e.g., natural and/or synthetic oil) to components of the transmission 106 and/or the drive axle assembly housing 108. In one example, to carry out the lubricant distribution, the lubrication system 118 may include a reservoir (e.g., a sump), a pump for driving lubricant flow through the system, a plurality of conduit, and/or other suitable lubricant distribution components such as nozzles, valves, jets, and the like. Additionally, the drive axle assembly housing 108 may include an enclosed splash lubrication arrangement. In such an example, as the differential 107 rotates, lubricant may be picked up and distributed to various components within the drive axle assembly housing 108. Occasionally, lubricant may escape the drive axle assembly housing 108 due to splashing and/or lubricant bubbles being carried by air that is exiting the drive axle assembly housing. The drive axle assembly housing 108 may include a baffle to reduce or prevent lubricant from escaping.

The vehicle 100 may include a control system 128 with a controller 130. The controller may include a processor 132 and a memory 134 holding instructions stored therein that when executed by the processor 132 may cause the controller 130 to perform various methods, control techniques, etc. described herein. The processor 132 may include a microprocessor unit and/or other types of circuits. The memory 134 may include known data and storage mediums such as random access memory, read-only memory, keep alive memory, combinations thereof, etc. The memory 134 may further include non-transitory memory.

The control system 128 may receive various signals from sensors 136 positioned in different locations in the vehicle 100 and the powertrain 102. Conversely, the controller 130 may send control signals to a plurality of actuators 138 coupled at different locations in the vehicle 100 and the powertrain 102.

For example, the controller 130 may send signals to the motive power source 104. Responsive to receiving the command signal, an actuator in the motive power source 104 may adjust output speed or torque. Other controllable components in the vehicle and transmission system may function in a similar manner with regard to receiving command signals and actuator adjustment. Further, during a drive mode, the controller 130 may adjust the motive power source 104 to achieve a desired vehicle speed, for instance. Conversely, during a coast mode, the motive power source 104 may be inactive and power may travel from at least one of the first drive wheel 110 and the second drive wheel 112 to the differential 107 and so forth.

FIG. 2 shows a drive axle assembly housing 200 according to the present disclosure. The drive axle assembly housing 200 is a non-limiting example of the drive axle assembly housing 108 of FIG. 1. The drive axle assembly housing 200 may include a differential (e.g., the differential 107 of FIG. 1) that provides a conversion of speed/torque between a motive power source and drive wheels of a vehicle.

The drive axle assembly housing 200 includes a bowl 202 for housing a differential, such as the differential 107 of FIG. 1. The drive axle assembly housing 200 further includes two axle housings 204 coupled to the bowl 202. The axle housings 204 each house at least a portion of a rotatable axle (e.g. the first axle shaft 115 and the second axle shaft 116 of FIG. 1). The rotatable axles each couple to a wheel (e.g., the first drive wheel 110 and the second drive wheel 112 of FIG. 1) and provide mechanical power (e.g., drive) to the wheels.

The drive axle assembly housing 200 includes an upper portion 206, a lower portion 208 and a substantially hollow interior portion, a portion of which is shown in FIGS. 5-8. The hollow interior portion may contain a pre-determined quantity of lubricant to lubricate and cool various moving parts, including the differential, within the drive axle assembly housing 200.

The drive axle assembly housing 200 may include an aperture 212 in the upper portion 206. While FIG. 2 depicts the aperture 212 being located in a cover 210 of the bowl 202, in other example, the aperture 212 may be located anywhere in the bowl 202 or the axle housings 204.

Regardless of location, the aperture 212 extends to the hollow interior portion of the drive axle assembly housing 200. The aperture 212 may be circular and is defined by a circular wall in the upper portion 206. In some examples, the circular wall may include a substantially smooth bore, however, in other examples, the circular wall may be threaded.

FIG. 2 further depicts a device for venting the drive axle assembly housing 200, also known as a breather 214. The breather 214 may extend through the drive axle assembly housing 200 and may provide a passage for air to enter and/or exit the drive axle assembly housing. In the illustrated example, a portion of the breather 214 that is positioned outside of the drive axle assembly housing 200 may be L-shaped. At least a portion of the breather 214 may be located in the aperture 212 of the upper portion 206. Further, the breather 214 may be located anywhere in the drive axle assembly housing 200 that is above the fill level (not shown) of the lubricant.

FIGS. 3 and 4 show a first schematic view and a second schematic view of a baffle 300, respectively, and will be described collectively. Each of FIG. 3 and FIG. 4 include a Cartesian coordinate system 399 to orient the views. The y-axis may be a vertical axis (e.g., parallel to a gravitational axis), the x-axis may be a longitudinal axis (e.g., horizontal axis), and/or the z-axis may be a lateral axis, in one example. However, the axes may have other orientations, in other examples.

The baffle 300 includes a first section 302, a second section 304, and a third section 306. The second section 304 is positioned intermediate the first section 302 and the third section 306. Further, the second section 304 is coupled to the first section 302 and the third section 306 along a first bend 308 and a second bend 310, respectively. The first section 302 may be angled relative to the second section 304 at an angle A1, as illustrated in FIG. 4. For example, the first section 302 may be oriented such that a front face 312 of the first section is positioned within a first plane 392, and the second section 304 may be oriented such that a front face 314 of the second section is positioned within a second plane 394, where the second plane 394 is angled relative to the first plane 392. The first plane 392 and the second plane 394 may intersect at the first bend 308. Similarly, the second section 304 may be angled relative to the third section 306 at an angle A2, as illustrated in FIG. 4. For example, the third section 306 may be oriented such that a front face 316 of the third section is positioned within a third plane 396, where the third plane 396 is angled relative to the second plane 394 and/or the first plane 392. In one example, the third plane 396 is angled to only the second plane 394 and parallel to the first plane 392. The second plane 394 and the third plane 396 may intersect at the second bend 310. In some examples, the first section 302, the second section 304, and the third section 306 may be oriented such that the baffle 300 is a z-shape.

The baffle 300 may be configured to compress and expand in directions parallel to double headed arrow 398, similar to a spring. Compression and expansion of the baffle 300 may occur as a result of the baffle bending at the first bend 308 and the second bend 310. As such, the baffle 300 may be compressed in a way that the angle A1 and/or the angle A2 may be reduced from approximately 90 degrees to a range of 0-80 degrees. In this way, the first section 302 may be moved closer to the second section 304 and/or the third section 306 may be moved closer to the second section 304 when a compressing force is applied to the baffle 300 in a direction parallel to double headed arrow 398. Compressing the baffle 300 may allow the baffle to be installed into a smaller space than would be possible if the baffle was not compressed. When a compressing force is no longer applied to the baffle 300, the baffle may extend along in directions parallel to double headed arrow 398 as the angle A1 and the angle A2 increase back to an angle of approximately 90 degrees. The baffle 300 may be configured to only bend at the first bend 308 and the second bend 310. For example, the baffle 300 may not bend at a point in the second section 304 when a compression force is applied. In one example, the baffle 300 is a resilient member, such as a spring, and expands when a compressive force is not applied thereto.

Further, in some examples, the baffle 300 may include high strength, low alloy, sheet metal steel, aluminum, and/or high temperature polymeric materials. Additionally or alternatively, the baffle 300 may include one or more of magnesium, titanium, carbon fiber, steel, stainless steel, silicon, polymers, and the like. The baffle 300 may be manufactured via a mold in some examples. Additionally or alternatively, the baffle 300 may be manufactured via additive manufacturing.

For example, the baffle 300 may be installed into a vent box of a drive axle assembly housing, such as the drive axle assembly housing 200 of FIG. 2. Further, the baffle 300 may exert an outward force in directions parallel to double headed arrow 398 similar to a spring, against one or more components within the drive axle assembly housing that are positioned proximate to the first section 302 and/or the third section 306. The expansion force (e.g., spring force) exerted by the baffle 300 may securely hold the baffle in place, without the use of fasteners, adhesives, attachment devices, combinations thereof, or the like. A positioning of the baffle 300 within a drive axle housing assembly is further described in reference to FIGS. 5-8.

The first section 302 of the baffle 300 includes an opening 318 and a tab 320. The tab 320 may be a portion of the first section 302 that has been cut (e.g., separated) from a remainder of the first section along an edge 322. Further, the tab 320 may be connected to the front face 312 of the first section 302 along a second edge 324, and angled away from the front face 312 at an angle A3. For example, the tab 320 may be oriented such that the tab is positioned within a fourth plane 393, where the fourth plane 393 is angled relative to the first plane 392 of the first section 302 at the angle A3. The opening 318 may be positioned immediately above the second edge 324, and may be framed by the second edge and a third edge 326, where the third edge is complimentary to the edge 322. As such, the opening 318 and the tab 320 may have the same shape. Additionally or alternatively, the opening 318 and the tab 320 may include complementary shapes, wherein the opening 318 and the tab 320 are shaped via a punch-out through a corresponding section of the baffle 300. In the illustrated example, the opening 318 and the tab 320 may both be partial ellipses, however, in other examples the tab and opening may be rectangles, triangles, half circles, or any other suitable shape.

In one example, the opening 318 is shaped via a punch-out through a body of the first section 302. The opening 318 may be arranged in the first plane 392 of the first section 302 and configured to direct gases in a direction normal to the first plane 392. The tab 320, which is continuous with the first section 302 and formed via punching out the opening 318, may extend in a first direction away from the front face 312 the first section 302. In one example, the front face 312 and the tab 320 each face in the first direction.

The second section 304 of the baffle 300 may include a second opening 328 and a second tab 330. In some examples, the second opening 328 and the second tab 330 may be the same shape and size as the opening 318 and the tab 320, respectively. The second tab 330 may be oriented in a fifth plane 395, where the fifth plane 395 is angled relative to the second plane 394 of the second section 304 at an angle A4. In one example, the second opening 328 is shaped via a punch-out through a body of the second section 304. The second opening 328 may be arranged in the second plane 394 of the second section 304 and configured to direct gases in a direction normal to the second plane 394. The second tab 330, which is continuous with the second section 304 and formed via punching out the second opening 328, may extend in a second direction away from a back face, which is opposite the front face 314 the second section 304. In one example, the back face (e.g., opposite the front face 314) and the second tab 330 each face in the second direction.

The third section 306 of the baffle 300 may include a third opening 332 and a third tab 334. In some examples, the third opening 332 and the third tab 334 may be the same shape and size as the opening 318 and the tab 320, respectively. The third tab 334 may be oriented in a sixth plane 397, where the sixth plane 397 is angled relative to the third plane 396 of the third section 306 at an angle A5. In one example, the third opening 332 is shaped via a punch-out through a body of the third section 306. The third opening 332 may be arranged in the third plane 396 of the third section 306 and configured to direct gases in a direction normal to the third plane 396. The third tab 334, which is continuous with the third section 306 and formed via punching out the third opening 332, may extend in a third direction away from the front face 316 the third section 306. In one example, the front face 316 and the third tab 334 each face in the third direction Lubricant may pass through one or more openings (e.g., the opening 318) of baffle 300 via splashing and/or bubbles carried by air. The relative angles between the tab 320 and the first section 302, the second tab 330 and the second section 304, and the third tab 334 and the third section 306 cause lubricant that is passing through the baffle 300 to change direction multiple times. Further, lubricant may come into contact with multiple flat surface and edges. As such, lubricant bubbles may condensate on the baffle 300 and lubricant may be blocked from passing straight through one or more openings of the baffle. By positioning the baffle 300 near a breather of a drive axle assembly housing (e.g., the breather 214 of the drive axle assembly housing 200), lubricant may be separated from vented air by the tabs and/or angle sections of the baffle, wherein the lubricant may return to a sump via a force of gravity.

FIG. 5 shows a cross-sectional view of an exemplary drive axle assembly housing 500, with the baffle 300 positioned within the drive axle assembly housing. FIG. 6 shows a second view of the drive axle assembly housing 500 and the baffle 300. A portion of the drive axle assembly housing 500 has been removed from view to facilitate visualization of the baffle 300 within the drive axle assembly housing. FIGS. 5 and 6 will be described collectively. Further, each of FIG. 5 and FIG. 6 include a Cartesian coordinate system 599 to orient the views. The y-axis may be a vertical axis (e.g., parallel to a gravitational axis), the x-axis may be a longitudinal axis (e.g., horizontal axis), and/or the z-axis may be a lateral axis, in one example. However, the axes may have other orientations, in other examples. In one example, a force of gravity is parallel to a direction opposite the y-axis.

The drive axle assembly housing 500 may be a non-limiting example of the drive axle assembly housing 200 of FIG. 2. As such, the drive axle assembly housing 500 may include a central section (e.g., a bowl) for housing a differential and two side sections (e.g., axle housings) coupled to the central section. Each of the side sections may house at least a portion of a rotatable axle (e.g. the first axle shaft 115 and the second axle shaft 116 of FIG. 1).

The drive axle assembly housing 500 may include an upper portion 502, a side portion 504, and a hollow interior portion 506. The upper portion 502, the side portion 504, a bottom portion (not shown) and a second side portion (not shown) may surround and define the outer boundary of the hollow interior portion 506. The hollow interior portion 506 may contain a pre-determined quantity of lubricant that lubricates and cools various moving parts, including the differential, within the hollow interior portion 506.

The drive axle assembly housing 500 includes a vent box 508. The vent box 508 may be a hollow portion of the drive axle assembly housing 500 that is defined by the upper portion 502, the side portion 504, and an interior wall 510. The interior wall 510 may be included in the drive axle assembly housing to hold the baffle 300 in place. Further, the interior wall 510 may extend from the upper portion 502, in a direction parallel to gravity 597 such that a bottom 512 of the interior wall is positioned proximate an interior corner 514 of the side portion 504. A passage 516 is located between the bottom 512 and the interior corner 514 such that air may pass from the hollow interior portion 506 to the vent box 508.

The drive axle assembly housing 500 may include an aperture 518 that passes through the upper portion 502. As such, the aperture 518 may fluidly couple the vent box 508 to an ambient atmosphere or area external to the hollow interior portion 506, allowing air to enter and/or leave the vent box of the drive axle assembly housing 500. In some examples, the aperture 518 may be circular (e.g., cylindrical) and may be defined by a circular wall 520 within the upper portion 502. In other examples, the aperture 518 may be rectangular, triangular, elliptical, or other suitable shape. In some examples, the circular wall 520 includes a substantially smooth bore, however, in other examples, the circular wall may be threaded and/or textured.

Although not illustrated in FIGS. 5 and 6, the drive axle assembly housing 500 may include a breather for venting air out of the drive axle assembly housing. A portion of the breather may be located within the aperture 518 of the upper portion 502. The breather may allow air to flow from the hollow interior portion 506, through the passage 516, through the vent box 508, into the aperture 518, and out of the drive axle assembly housing 500.

As illustrated in FIGS. 5 and 6, the baffle 300 is positioned within the vent box 508. The baffle 300 may be oriented such that at least a portion (e.g., an end) of the first section 302 is proximate to and in face sharing contact with the interior wall 510. Further, at least a portion (e.g., and end) of the third section 306 may be proximate to and in face sharing contact with a surface 522 of the vent box 508, where the surface 522 is positioned opposite the interior wall 510. Further, the first bend 308 and/or the second bend 310 of the baffle 300 may be positioned proximate to and in face sharing contact with an inner surface of the vent box 508.

The baffle 300 may be held between the interior wall 510 and the surface 522 due to the first section 302 exerting a force on the interior wall 510 and the third section 306 exerting a force on the surface 522. The force exerted by the baffle 300 on the interior wall 510 and the surface 522 may be adjusted by adjusting a shape, thickness, and/or material of the baffle 300. The force may be adjusted due to one or more of flow dynamics of air to the air box, a packaging size, a vehicle configuration, and an intended vehicle use. As such, the baffle 300 may be installed in the vent box 508 and retained therein without a fastener, tool, or other similar device. By doing this, a manufacturing cost and complexity of installing the baffle 300 may be reduced. Further, the baffle 300 may be compressed during installation such that the baffle may slide through the passage 516 in a more compressed state than the expanded state of the baffle 300 in the vent box 508. In this way, installation of the baffle 300 within the drive axle assembly housing 500 may be less complex and faster than a baffle that does not compress and/or utilizes an attachment device.

The baffle 300 may interfere with air and/or lubricant that flows through the vent box 508. For example, air, represented by solid arrows 550, and lubricant, represented by dashed arrows 552, may first travel from the hollow interior portion 506, through the passage 516, and into the vent box 508. Air (e.g., solid arrows 550) and lubricant (e.g., dashed arrows 552) may flow through the opening 318 of the first section 302. The tab 320 may block direct flow of the air and lubricant to the opening 328 of the second section 304. Collisions with the baffle 300 in combination with the swirling and indirect flow pattern through the baffle 300 may promote separation of the lubricant from the air. As such, a portion of lubricant may not flow through the second opening. The lubricant and deposit onto surfaces of the vent box 508 and return to a lubricant sump within the housing. Next, the air and the lubricant may flow past the second tab 330 and through the second section 304 (e.g., through the second opening 328 of FIG. 3) of the baffle 300. The second tab 330 may direct the air and lubricant away from the third opening of the third section 306. Turbulence of the air mixed with lubricant increases, further promoting separation of the lubricant from air. The air and the lubricant may then travel past the third tab 334 and through the third section 306 (e.g., through the third opening 332 of FIG. 3) of the baffle 300. The third tab 334 may direct the air and lubricant away from the aperture 518. As illustrated by the size of the dashed arrows 552, a relatively small amount of lubricant flows through the third opening. The turbulence and misdirected flow following the third section may separate a remainder of the lubricant mixed in the air such that only air or substantially only air (e.g., <1% lubricant) flows through the aperture 518. As such, an entirety of the air that enters the vent box 508 from the hollow interior portion 506 may travel through the baffle 300 and exit the vent box via the aperture 518. The amount of lubricant may be represented by the size of the dashes in each of the dashed arrows 552.

In this way, it may be difficult for lubricant (e.g., oil) to reach the breather due to the angled sections and tabs of the baffle 300. The angled sections and tabs force the air and/or lubricant to follow multiple turns while providing a large amount of surface area for the lubricant to adhere to. Further, splashes of lubricant that reach the vent box 508 may not easily pass though the baffle 300, and instead may be deflected back towards the hollow interior portion 506. In this way, the positioning of the baffle 300 within the vent box 508 of the drive axle assembly housing 500 may reduce or prevent lubricant from reaching the breather (e.g., the aperture 518) and/or exiting the drive axle assembly housing via the vent box.

FIG. 7 shows a drive axle assembly housing 700, with the baffle 300 oriented in a first position. FIG. 8 shows a drive axle assembly housing 700, with the baffle 300 oriented in a second position. A portion of the drive axle assembly housing 700 has been removed from view to facilitate visualization of the baffle 300 within the drive axle assembly housing 700. Further, each of FIG. 7 and FIG. 8 include a Cartesian coordinate system 799 to orient the views. The y-axis may be a vertical axis (e.g., parallel to a gravitational axis), the x-axis may be a longitudinal axis (e.g., horizontal axis), and/or the z-axis may be a lateral axis, in one example.

However, the axes may have other orientations, in other examples. In one example, a force of gravity is parallel to a direction opposite the y-axis.

The drive axle assembly housing 700 may include a hollow interior portion 702, a vent box 704, an aperture 706, and a breather (not shown), similar to the drive axle assembly housing 500 of FIGS. 5 and 6. The vent box 704 may be positioned near a cover of the drive axle assembly housing. Further, the vent box 704 may be defined by an inner surface 708, an extension 710, and a plate 712. The inner surface 708 may include a bottom surface 714, a side surface 716, and a top surface 718, where the top surface is longer than the bottom surface. The top surface 718 may extend from the side surface 716 to the extension 710, and the extension may extend in the direction of gravity 797 from the top surface. The plate 712 may include of a first section 720 and a second section 722, where the first section is longer than the second section. Further, the plate 712 may include a corner 724 that is positioned intermediate the first section 720 and the second section 722, and couples the first section and the second section together. The first section 720 may be angled relative to the second section 722 such that the plate 712 has an L-shape. In one example, the angle of the corner 724 may be greater than 90°.

An attachment device 726 may pass through the second section 722 of the plate 712, and may couple the plate to the extension 710 of the drive axle assembly housing 700. The attachment device 726 may be a bolt, a screw, or other type of fastener. In some examples, at least a portion of the attachment device 726 may pass entirely through the extension 710, and may therefore be positioned within the vent box 704. In some examples, additionally or alternatively, the plate 712 may be physically coupled to the drive axle assembly housing 700 via adhesives, welds, fusion, or other similar process.

The aperture 706 may pass through the top surface 718 of the inner surface 708. As such, the aperture 706 may fluidly couple the vent box 704 to the outside environment, allowing air to enter and/or leave the vent box of the drive axle assembly housing 700. In some examples, the aperture 706 may be circular (e.g., cylindrical). In other examples, the aperture 706 may be rectangular, triangular, elliptical, or other suitable shape. In some examples, an inner surface of the aperture 706 includes a substantially smooth bore, however, in other examples, the inner surface of the aperture may be threaded and/or textured. Air may pass from the hollow interior portion 702, through the vent box 704, through the aperture 706 (e.g., through the breather), and out of the drive axle assembly housing 700.

The baffle 300 may be positioned in the vent box 704 of the drive axle assembly housing 700. As illustrated in FIG. 7, a portion (e.g., an end) of the first section 302 of the baffle 300 may be positioned proximate to and in face sharing contact with the extension 710. Further, a portion (e.g., an end) of the third section 306 may be positioned proximate to and in face sharing contact with the side surface 716 of the inner surface 708. The baffle 300 may be compressed between the side surface 716 and the extension 710. As such, the first section 302 may exert a force on the extension 710 and the third section may exert a force on the side surface 716. The force exerted by the baffle 300 may securely hold the baffle in place without the use of an attachment device and/or bores configured for mounting. For example, the baffle 300 may apply a threshold (e.g., a pre-determined) force against one or more portions of the inner surface 708. The threshold force may be based on an expected operation of the vehicle that includes the baffle 300 and may be greater than forces applied to the baffle due to vibration, harshness, forces generated due to road surface unevenness, combinations thereof, and the like. Further, the first bend 308 of the baffle 300 may be positioned proximate to and in face sharing contact with the first section 720 of the plate 712. Similarly, the second bend 310 may be positioned proximate to and in face sharing contact with the top surface 718 of the inner surface 708. As such, air and oil may be force to go through the openings (e.g., the opening 318) of the baffle 300 in order to reach the aperture 706 (e.g., the breather).

The baffle 300 may be compressed during installation and squeezed into the vent box 704. For example, the attachment device 726 and the plate 712 may be removed, the baffle 300 may be compressed and inserted into the vent box 704, and the plate and attachment device may be replaced. In this way, installation of the baffle 300 within the drive axle assembly housing 700 may be less complex and faster than a baffle that does not compress and/or requires an attachment device. In another example, the plate 712 may remain installed (e.g., attached to the drive axle assembly housing 700 by the attachment device 726) as the baffle 300 in installed into the vent box 704. As such, the baffle 300 may be compressed and squeezed past the plate 712 in such a way that the baffle is positioned between the plate and the inner surface 708 of the vent box 704 and oriented in a way that mitigates lubricant exiting the drive axle assembly housing 700.

In some examples, the inner surface of the plate 712 and/or the inner surface 708 of the vent box 704 may be textured in one or more regions. When included, the textured regions may be in face sharing contact with the baffle 300, for example, at the first bend 308, the second bend 310, an end of the first section 302 opposite the first bend, and/or an end of the third section 306 opposite the third bend, and may help to hold the baffle in a desired location. The textured regions may be supporting rides and/or rough (e.g., such as a sand-paper texture), in some examples.

FIG. 8 shows the drive axle assembly housing 700 and the baffle 300, with the baffle oriented in a second position. A portion of the drive axle assembly housing 700 has been removed from view to facilitate visualization of the baffle 300 within the drive axle assembly housing.

A portion (e.g., an end) of the first section 302 of the baffle 300 may be positioned proximate to and in face sharing contact with the side surface 716 of the inner surface 708. Further, a portion of the third section 306 may be positioned proximate to and in face sharing contact with the plate 712. The baffle 300 may be compressed between the side surface 716 and the plate 712. As such, the first section 302 may exert a force on the side surface 716 and the third section may exert a force on the plate 712. The force exerted by the baffle 300 may securely hold the baffle in place without the use of an attachment device and/or bores configured for mounting. Further, the first bend 308 of the baffle 300 may be positioned proximate to and in face sharing contact with the first section 720 of the plate 712. Similarly, the second bend 310 may be positioned proximate to and in face sharing contact with the top surface 718 of the inner surface 708. As such, air and oil may be force to go through the openings (e.g., the opening 318) of the baffle 300 in order to reach the aperture 706 (e.g., the breather).

The baffle 300 may be compressed during installation such that the baffle may fit into the vent box 704. For example, the attachment device 726 and the plate 712 may be removed, the baffle 300 may be compressed and inserted into the vent box 704, and the plate and attachment device may be replaced such that the baffle is compressed by the plate and the inner surface 708 of the vent box. In this way, installation of the baffle 300 within the drive axle assembly housing 700 may be less complex and faster than a baffle that does not compress and/or requires an attachment device.

In each of the orientations shown in FIGS. 7 and 8, the baffle 300 may interfere with air that flows through the vent box 704. For example, air that travels from the hollow interior portion 702 to the aperture 706 (e.g., the breather) passes through the openings (e.g., the opening 318 in the first section 302) in the baffle. As such, it may be difficult for bubbles of lubricant (e.g., oil) to reach the breather due to the angled sections and tabs of the baffle 300. The angled sections and tabs force the air and/or lubricant to follow multiple turns while providing a large amount of surface area for the lubricant to adhere to. Further, splashes of lubricant that reach the vent box 704 may not easily pass though the baffle 300, and instead may be deflected back towards the hollow interior portion 702. In this way, the positioning of the baffle 300 within the vent box 704 of the drive axle assembly housing 700 may reduce or prevent lubricant from reaching the breather and/or exiting the drive axle assembly housing via the vent box.

Current axle vents mounted in close proximity to splashing oil from rotating gears require a bolt-on baffle plate to be installed. A bolt-on baffle prevents lubricant from directly splashing on the exit/entrance to the axle vent. Bolt-on baffles are typically stamped and are held to a tight tolerance once assembled, such that all of the parts fit together as designed and the baffle does not fall out of position and possibly interfere with the rotating gears. The proposed baffle is a rough stamped part with pierced holes that can be installed by hand into a cavity and captured in place by the further assembly of other components. The baffle provides baffling of lubricant while also providing a simplistic assembly that eliminates components and manufacturing cost.

The intent of the baffle is to reduce, or prevent, lubricant from escaping through the venting device of a drive axle housing. The baffle may be a simple stamped feature with folds and air passages partially stamped into the baffle. The stamped passageways in the baffle force air and oil to flow around multiple corners. It may be hard for oil bubbles to maintain adhesion when passing through multiple planes and the oil may not be able to adhere to the baffle and/or remain a bubble. Air flow through the baffle results in no oil bubbles reaching the vent exit. The baffle may be designed with multiple bends/folds which allow the baffle to act like a spring. As such, the baffle may be installed in place prior to final assembly and captured in place during assembly so such that the baffle may not move out of position. In this way, installation of the baffle may not utilize a precision mounting hole in the baffle or a mating drilled and tapped hole in a carrier to mount the baffle. Therefore, the baffle may lead to simpler installation and an elimination of machining, assembly, and cost of fasteners.

The technical effect of a baffle that may act like a spring and includes multiple sections, tabs, and openings is that the baffle may be installed into a drive axle assembly housing without any attachment devices or holes configured for mounting the baffle. Further, the baffle may reduce or stop lubricant from escaping from a drive axle assembly housing by directing air flow though through openings and around corners of the baffle.

FIGS. 2-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure provides support for an axle assembly for a vehicle including a baffle comprising a first section parallel to a first plane, a second section parallel to a second plane and angled to the first section, and a third section parallel to a third plane and angled to the first section and the second section; wherein the baffle is a spring. A first example of the axle assembly includes where the baffle applies a force to components of the axle assembly. A second example of the axle assembly, optionally including the first example, further includes where the baffle is retained in the axle assembly via only the force. A third example of the axle assembly, optionally including one or more of the previous examples, further includes where each of the first section, the second section, and the third section comprises at least one opening and a tab. A fourth example of the axle assembly, optionally including one or more of the previous examples, further includes where a first bend is between the first section and the second section and a second bend is between the second section and the third section, wherein the first bend and the second bend are flexible and the first section, the second section, and the third section are rigid. A fifth example of the axle assembly, optionally including one or more of the previous examples, further includes where each of the first section, the second section, and the third section is square. A sixth example of the axle assembly, optionally including one or more of the previous examples, further includes where the baffle comprises a z-shape. A seventh example of the axle assembly, optionally including one or more of the previous examples, further includes where the baffle is free of a mounting hole and is not retained in the axle assembly via a physical coupling element.

The disclosure provides additional support for an axle assembly of a vehicle including a vent box comprising a plate adjacent to a port and a baffle configured to expand within a cavity shaped by the plate, wherein the baffle is retained within the cavity via only a force applied by the baffle to the plate. A first example of the axle assembly further includes where the baffle comprises a first section, a second section, and a third section arranged along three different planes. A second example of the axle assembly, optionally including the first example, further includes where the baffle is flexible between the first section and the second section and between the second section and the third section. A third example of the axle assembly, optionally including one or more of the previous examples, further includes where each of the first section, the second section, and the third section comprises a tab and an opening. A fourth example of the axle assembly, optionally including one or more of the previous examples, further includes where the tab is angled to a corresponding section. A fifth example of the axle assembly, optionally including one or more of the previous examples, further includes where the baffle is compressible. A sixth example of the axle assembly, optionally including one or more of the previous examples, further includes where air flows through multiple planes as it flows through the baffle to the port.

The disclosure provides further support for a baffle of an axle assembly including a first section arranged along a first plane and comprising a first tab and a first opening, a second section arranged along a second plane and comprising a second tab and a second opening, a third section arranged along a third plane and comprising a third tab and a third opening, a first bend arranged between the first section and the second section, and a second bend arranged between the second section and the third section, wherein the first bend and the second bend are flexible. A first example of the baffle further includes where the first opening forces air to flow in a first direction, the second opening forces air to flow in a second direction angled to the first direction, and the third opening forces air to flow in a third direction angled to the second direction. A second example of the baffle, optionally including the first example, further includes where the third direction is parallel to the first direction. A third example of the baffle, optionally including one or more of the previous examples, further includes where the first tab is arranged along a fourth plane, the second tab is arranged along a fifth plane angled to the fourth plane, and the third tab is arranged along a sixth plane angled to each of the fourth plane and the fifth plane. A fourth example of the axle assembly, optionally including one or more of the previous examples, further includes where the fourth plane is parallel to the second plane.

As used herein, the term "approximately" is construed to mean plus or minus five percent of the range unless otherwise specified.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle comprising an axle assembly, the axle assembly, comprising:
   a vent box; and
   a baffle comprising a first section parallel to a first plane, a second section parallel to a second plane and angled to the first section, and a third section parallel to a third plane and angled to the first section and the second section, each of the first section, second section, and third section comprises an opening; wherein the baffle is a spring positioned within the vent box.

2. The axle assembly of claim 1, wherein the baffle applies a force to a surface of the vent box.

3. The axle assembly of claim 2, wherein the baffle is retained in the vent box via only the force.

4. The axle assembly of claim 1, wherein each of the first section, the second section, and the third section comprises at least one opening and a tab.

5. The axle assembly of claim 1, wherein a first bend is between the first section and the second section and a second bend is between the second section and the third section, wherein the first bend and the second bend are flexible and the first section, the second section, and the third section are rigid.

6. The axle assembly of claim 1, wherein each of the first section, the second section, and the third section is square.

7. The axle assembly of claim 1, wherein the baffle comprises a z-shape.

8. The axle assembly of claim 1, wherein the baffle is free of a mounting hole and is not retained in the axle assembly via a physical coupling element.

9. An axle assembly of a vehicle, comprising:

a vent box comprising a plate adjacent to a port; and a baffle configured to expand within a cavity shaped by the plate, wherein the baffle is retained within the cavity via only a force applied by the baffle to the plate, wherein the baffle comprises a first section, a second section, and a third section arranged along three different planes and each comprising a tab and an opening, wherein the tab is angled to a corresponding section.

10. The axle assembly of claim 9, wherein the baffle is flexible between the first section and the second section and between the second section and the third section.

11. The axle assembly of claim 9, wherein the baffle is compressible.

12. The axle assembly of claim 9, wherein air flows through multiple planes as it flows through the baffle to the port.

13. A baffle of an axle assembly, comprising:

a first section arranged along a first plane and comprising a first tab and a first opening;

a second section arranged along a second plane and comprising a second tab and a second opening;

a third section arranged along a third plane and comprising a third tab and a third opening;

a first bend arranged between the first section and the second section; and a second bend arranged between the second section and the third section; wherein the first bend and the second bend are flexible.

14. The baffle of claim 13, wherein the first opening forces air to flow in a first direction, the second opening forces air to flow in a second direction angled to the first direction, and the third opening forces air to flow in a third direction angled to the second direction.

15. The baffle of claim 14, wherein the third direction is parallel to the first direction.

16. The baffle of claim 13, wherein the first tab is arranged along a fourth plane, the second tab is arranged along a fifth plane angled to the fourth plane, and the third tab is arranged along a sixth plane angled to each of the fourth plane and the fifth plane.

17. The baffle of claim 16, wherein the fourth plane is parallel to the second plane.

* * * * *